June 20, 1967 K. A. HUELSMAN 3,327,229
VOLTAGE TO FREQUENCY CONVERTER UTILIZING VOLTAGE CONTROLLED
OSCILLATOR AND OPERATIONAL AMPLIFIER
Filed Dec. 30, 1964 2 Sheets-Sheet 1

INVENTOR.
KENNETH A. HUELSMAN
BY.
AGENT.

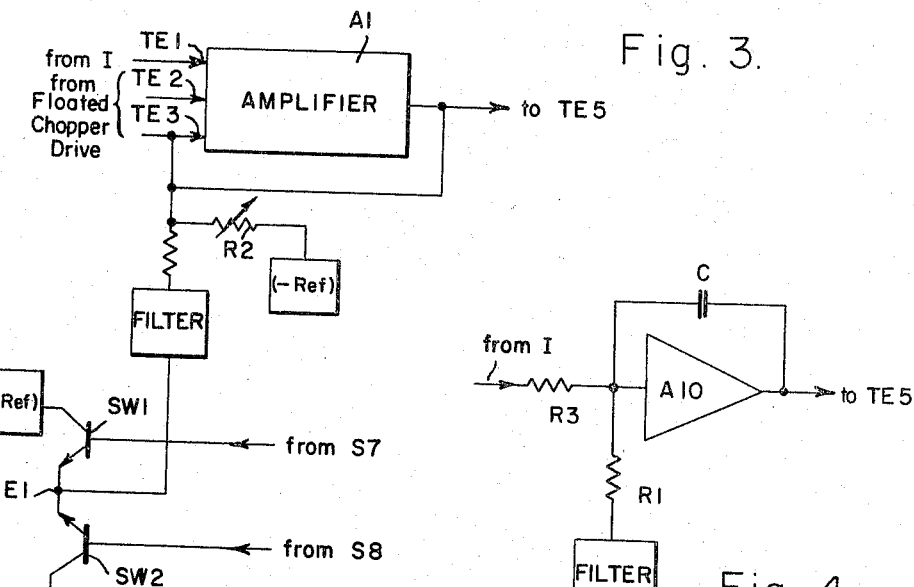
Fig. 3.
Fig. 4.
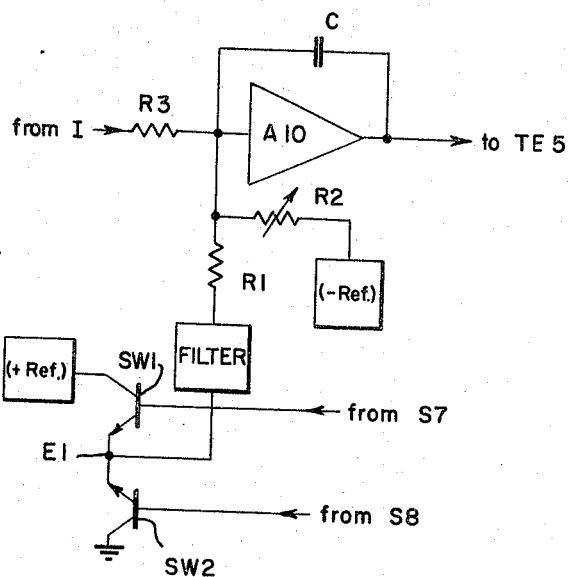
Fig. 5.
INVENTOR.
KENNETH A. HUELSMAN
BY.
AGENT.

United States Patent Office 3,327,229
Patented June 20, 1967

3,327,229
VOLTAGE TO FREQUENCY CONVERTER UTILIZING VOLTAGE CONTROLLED OSCILLATOR AND OPERATIONAL AMPLIFIER
Kenneth A. Huelsman, Oceanside, Calif., assignor, by mesne assignments, to Weston Instruments, Inc., Newark, N.J., a corporation of Delaware
Filed Dec. 30, 1964, Ser. No. 422,382
7 Claims. (Cl. 328—150)

This invention relates generally to electrical converters and more particularly to voltage to frequency and voltage to time converters.

In certain of its aspects this invention is related to a copending application of Kenneth A. Huelsman and Joe E. Deavenport, Ser. No. 355,608, filed Mar. 30, 1964, and entitled, Converter, now Patent No. 3,260,943.

Certain details of the subject matter of this application are also to be found in a copending application of Joe E. Deavenport and Don W. Sexton, Ser. No. 270,336, filed Apr. 3, 1963, and entitled, Converters.

Both applications aforesaid are assigned to the assignee of this invention.

Voltage to frequency converters broadly comprise circuit means capable of receiving an input voltage such as a direct current voltage and converting such input voltage to a time varying voltage having a frequency proportional to or inversely proportional to the magnitude of the input voltage.

Voltage to time converters, while involving apparatus similar to voltage to frequency converters in many respects, produce an output which is the reciprocal frequency, that is, $1/f$ where $f$ represents output frequency and $1/f$ denotes time.

Circuits of this general nature have usually employed capacitors as part of the converter circuit or in control loops forming part of control circuits for controlling the converter circuit. Such circuits are usually satisfactory for many applications, particularly where high grade stable capacitors are employed. At times, however, capacitor drift may obviate high accuracy conversion.

In another type of converter circuit the output of a digital number register is decoded and coupled to one input of a capacitor, the other input of which receives the voltage which is to be converted. When there is no coincidence between input voltages being compared the digital number register keeps running in a particular direction until such time as the output of the decoder at the comparator matches the input voltage, at which time the digital number register setting represents the input voltage.

In still another arrangement a summing integrator is utilized which is controlled by an input voltage to control a pulse generator. The output of the pulse generator is then fed back in a negative sense to the summing integrator. The use of a closed loop system in such an arrangement offers some advantages with respect to linearity. In this case the application of the input voltage directly to the integrator requires that the integrator cycle at a rate proportional to the magnitude of the input voltage. Integrator cycling is achieved by using a pulse having a constant predetermined area each time the integrator voltage which is applied to it reaches a predetermined value. Thus, the pulses having fixed predetermined energy, the pulse frequency is determined by the magnitude of the input voltage in achieving the conversion.

Although there are other arrangements for achieving conversions of the general class described these are afield of subject matter of the class with which the present invention is concerned.

One object of this invention is to provide improved electrical converters which are simple and accurate.

Another object of this invention is to provide improved electrical converters which are relatively insensitive to changing electrical characteristics of their components.

A specific object of this invention is to provide improved arrangements for linearly achieving voltage to frequency or voltage to time conversions.

Another specific object of this invention is to provide a voltage conversion device which can be used separately or in conjunction with a counter to provide a digital voltmeter.

The aforesaid and other objects and advantages are accomplished, according to a presently preferred embodiment of this invention functioning as a voltage to frequency converter, in a circuit arrangement which utilizes a voltage controlled oscillator for effecting a conversion from an input voltage to an electrical quantity having a frequency which is dependent upon the input voltage. The input of the voltage controlled oscillator is coupled to the output of an amplifier such as a potentiometric amplifier or an integrator type of operational amplifier which in turn receives the input voltage. In order to handle voltages of opposite polarity such an arrangement may have a predetermined output frequency for zero input voltage so that the application of a positive going voltage to the input of the amplifier may result in a decrease (or an increase) of the output frequency of the voltage controlled oscillator and the application of a negative input voltage to the amplifier results in an increase (or a decrease) in the output of the oscillator from the predetermined or center frequency resulting from zero input voltage.

Linearity is achieved in the provision of a feedback network which includes a switching circuit controlled by the electrical output of the voltage controlled oscillator and by the output of a fixed frequency oscillator to alternately switch reference voltages of differing polarity in the input circuit of the amplifier in suitably timed relationship to provide the required average DC feedback voltage.

The aforesaid and other objects and advantages will be better understood by reference to the following specification when considered in conjunction with the accompanying drawings in which:

FIG. 3 is a modification of the arrangement illustrated in FIG. 1 showing a different reference voltage arrangement;

FIG. 4 is a further modification of the arrangement illustrated in FIG. 1 substituting an integrating type of operational amplifier for the amplifier shown in FIG. 1; and FIG. 5 is a modification of the arrangement illustrated in FIG. 4 showing a different reference voltage arrangement at the input of the operational amplifier.

Figure 1:
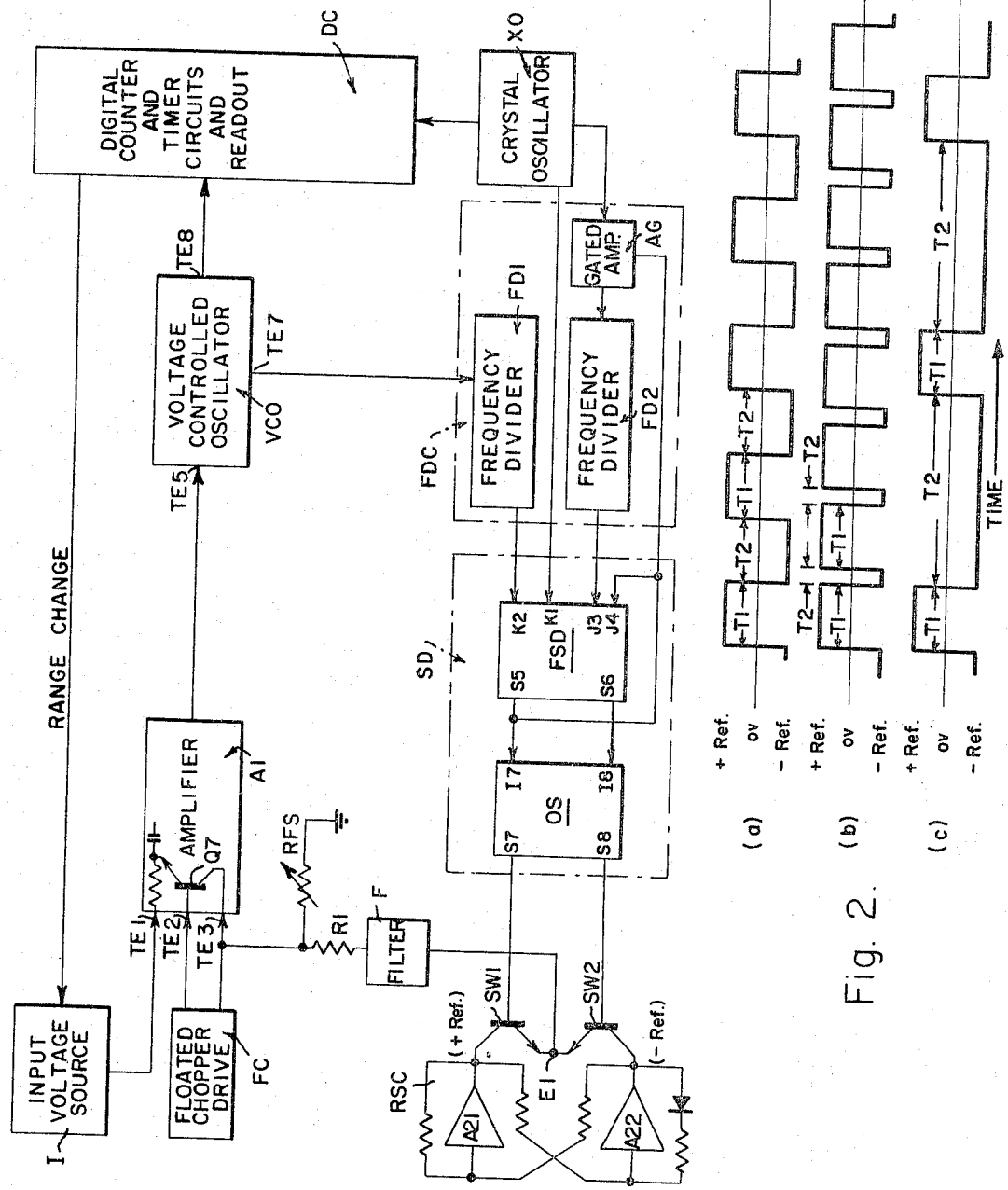
FIG. 1 is a block diagram illustrating one embodiment of this invention.

FIG. 1 illustrates a digital voltmeter which utilizes a voltage controlled oscillator VCO for converting input voltage to an output voltage having a frequency dependent upon the magnitude of the input voltage. While any suitable type of oscillator for receiving input voltage and converting such input voltage to a frequency having a predetermined relationship to the input voltage may be employed herein, one particular type which is useable is illustrated in the copending application of Joe E. Deavenport et al. identified hereinabove. The input to the voltage controlled oscillator is represented as a chopper stabilized amplifier generally designated A1 having a plurality of input terminals TE1, TE2 and TE3, respectively receiving an input voltage to be measured from an input voltage source generally designated I and the output of a floated chopper drive FC which is applied to the terminals TE2 and TE3. A circuit of the type suitable for the amplifier A1 may have an open loop gain of about 100 db or more, depending upon the desired accuracy, linearity and general performance desired. Again, reference may be made to the copending application aforesaid of Joe E. Deavenport et al. for circuits illustrating the details of the input voltage source, floated chopper drive and the amplifier A1 which in this instance is a potentiometric type of amplifier.

The electrical output of the voltage controlled oscillator VCO appears at output terminals TE7 and TE8. Output terminal TE8 may be coupled as input to any suitable digital counter system DC capable of receiving the electrical output of the oscillator under the control of timing circuits coupled to and driven by a fixed frequency oscillator such as a crystal oscillator designated XO, the digital counter circuits producing a quantized indication of the magnitude and sign of the input voltage. To accommodate electrical inputs which are beyond the range of the digital counter circuits or beyond the range of the circuits of the input amplifier A1 provision may be made by means of a range changing circuit coupled from the digital counter DC to switching impedance networks (not shown) in the input voltage source I to properly scale the input voltage to the amplifier means A1. The details of such circuits are also covered in the copending application of Joe E. Deavenport et al. aforesaid and are not duplicated herein in the interests of simplicity.

Although the details of the potentiometric amplifier A1 are described in the application of Joe E. Deavenport et al. aforesaid, for the purposes of this discussion a chopper transistor Q7 is illustrated in the input of the amplifier having its emitter coupled to the output of the input voltage source I at terminal TE1 and having its base and collector coupled, respectively, to the output of a floated chopper drive FC at terminals TE2 and TE3. The emitter circuit as shown is coupled through a capacitor to the input circuits of the amplifier.

In the arrangement herein illustrated the output of a feedback circuit receiving its input from terminal TE7 of the voltage controlled oscillator is coupled to the collector of the chopper transistor Q7 to further control the converter circuit. This feedback circuit includes a frequency divider circuit FDC driven by the output of the voltage controlled oscillator, a switch drive SD, switching transistors SW1 and SW2, forming part of a reference voltage switching circuit RSC controlled by the switch drive SD, a filter F and resistor R1 coupled to the collector of the chopper transistor Q7. As illustrated, the switching transistors SW1 and SW2 are of the n-p-n variety having common emitter circuits coupled to the terminal E1 which is an output terminal of the reference voltage switching circuit RSC and having respective collector circuits coupled to the outputs of respective amplifiers A21 and A22 constituting positive and negative reference voltage networks. Any suitable constant DC precision reference voltage supply may be substituted for that shown. In the circuit arrangement as thus far described, when the transistor switch SW1 is conducting a positive reference voltage (+Ref) is coupled to the terminal E1; when the transistor switch SW2 is conducting a negative reference voltage (—Ref) is coupled to the terminal E1.

Transistor switches SW1 and SW2 are controlled by the switch drive SD having a pair of output terminals S7 and S8 coupled to the bases of the respective transistor switches and providing complementary output voltages which, according to one embodiment of this invention, switch between positive and negative potentials in the two voltage states of each of the output terminals. When the terminal S7 is in the higher (positive potential) of its two voltage states an enabling voltage is applied to the base of the transistor switch SW1 causing this transistor to conduct to couple current from the positive reference voltage supply to the filter F and thence via feedback resistor R1 to the collector of the chopper transistor Q7. At the time the terminal S8 is at some predetermined positive potential the terminal S8 is at some predetermined negative potential and the transistor switch SW2 is cut off. When the terminal S8 switches to the higher (positive) of its two voltage states the terminal S7 switches to the lower (negative) of its two voltage states cutting off transistor switch SW1 and switching transistor switch SW2 to conduction so that current from the negative reference voltage supply is coupled to the feedback resistor R1.

Control of the switch drive SD in the feedback circuit is provided by means of a frequency divider circuit generally designated FDC which is under the control of the electrical output of the voltage controlled oscillator VCO appearing at the output terminal TE7 and the electrical output of a fixed frequency oscillator, here identified as a crystal oscillator generally designated XO. The electrical output of the frequency divider FDC which is coupled as input to the switch drive SD switches the switch drive SD between its two stable states in time intervals of relative duration determined by the frequency of the voltage controlled oscillator VCO in relation to the frequency of the crystal oscillator. In this embodiment of the invention the crystal oscillator provides a fixed time interval of lesser time duration than the shortest time interval provided by the output of the voltage controlled oscillator VCO when operating at its highest frequency. Further, in accordance with this illustrated embodiment of this invention, the crystal oscillator determines the length of time that the transistor switch SW1 coupling current from the positive terminal (+Ref) will be conducting to produce an output which is coupled from the positive reference voltage source to the collector of the transistor Q7 and the voltage controlled oscillator which determines the total time period (for a particular frequency of the voltage controlled oscillator) thus determines the length of time the transistor switch SW2 will be conducting so that current will be coupled from the negative voltage source to the collector of the chopper transistor Q7 in the amplifier A1.

Thus, an average DC voltage current of relatively positive or negative polarity for the illustrated embodiment depending upon the relationship of the fixed period of switching to the variable period of switching is coupled by the filter F and the feedback resistor R1 to the collector of the chopper transistor Q7 to provide a correction voltage or current in the input of the amplifier A1 of a magnitude and sense required to bring the output frequency of the voltage controlled oscillator precisely to that value indicative of the input voltage.

The particular manner in which the switching operation takes place in providing feedback to the input of the amplifier A1 as described will be better understood by referring more particularly to the details of the frequency divider circuit and the switch drive. As will be seen in FIG. 1, individual frequency dividers or counters FD1 and FD2, respectively, which may each be of the cascaded flip-flop variety, are coupled to the outputs of the voltage controlled oscillator VCO and crystal oscillator XO. In the latter case coupling is achieved through an AND gate type of circuit which may be a gated amplifier generally designated AG. The single input of this circuit is coupled to an output terminal S5 of the flip-flop switch drive circuit FSD for a purpose yet to be described. As earlier noted herein, the output of the crystal oscillator XO is instrumental in providing a fixed time interval for switching of the switch drive SD which is shorter than the shortest time interval established by the voltage controlled oscillator VCO when the voltage controlled oscillator is operating at its highest frequency. To this end the frequency of the crystal oscillator and the frequency division provided by the frequency divider FD2 is such as to provide a switching signal at an input terminal J3 of the flip-flop switch drive FSD to effect a switching operation within the switching interval provided by the output of the frequency divider FD1 coupled to a terminal K2 of the flip-flop switch drive FSD for the highest frequency of the voltage controlled oscillator VCO.

According to one practical embodiment of this invention the flip-flop switch drive FSD may be a conventional type of transistor flip-flop of the J–K variety in which the flip-flop is caused to switch from one stable state to the other by the application of input voltage to the respective J and K input terminals. This circuit having minor variations from the conventional type in the provision of enabling circuits coupled to the respective terminals J4 and K2. The flip-flop is switched by the coupling of a positive going voltage pulse to one of the two switching terminals J3 and K1 whenever the associated one of the enabling terminals J4 and K2 has an enabling voltage thereon. For the purposes of this description, at any time an enabling voltage is on the terminal J4, that is, when the output terminal S5 is in the higher of its two voltage states, a positive going voltage pulse coupled to the terminal J3 will cause the flip-flop FSD to switch. Likewise, at any time an enabling voltage is on the terminal K2, indicating a full count in the frequency divider FD1, at which time the terminal K2 is placed in the higher of its two voltage states, a positive going voltage pulse on the terminal K1 will cause the flip-flop FSD to switch, at which time the terminal S6 goes to the lower of its two voltage states and the terminal S5 again goes to the higher of its two voltage states. The details of the flip-flop switch drive FSD may be had by reference to the application of Kenneth A. Huelsman et al. aforesaid. It will be noted that the output of the crystal oscillator XO is also coupled to the input terminal K1 of the flip-flop switch drive FSD. Thus, when the frequency divider FD1 has proceeded through a full count the positive output thereof enables terminal K2. The next positive going output of oscillator XO coupled to the terminal K1 will switch the flip-flop so that the terminal S5 goes to the higher of its two voltage states.

The terminals S5 and S6 of the flip-flop switch drive FSD are coupled as inputs to terminals I7 and I8 of an output switch OS which is so arranged that a positive going output signal on the terminal I7 causes the terminal S7 to go to the higher (positive) of its two voltage states and a positive going voltage on the input terminal I8 causes the terminal S8 to switch from its lower (negative) to the higher (positive) of its two voltage states to thereby selectively switch the transistor switches SW1 and SW2. The details of the output switch OS are described in the copending application of Kenneth A. Huelsman et al. aforesaid.

Figure 2:
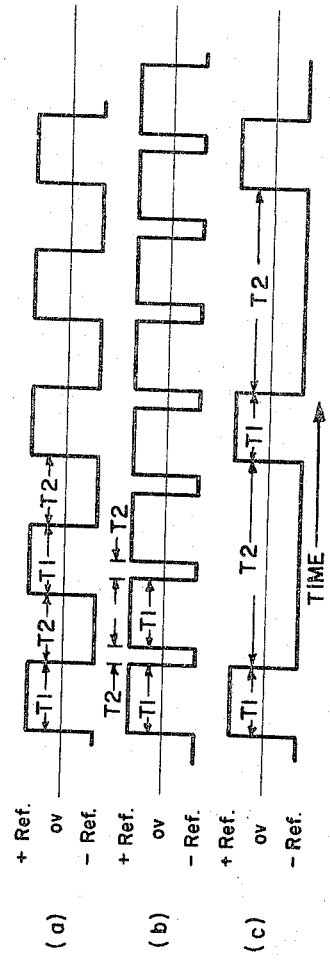
FIG. 2 is a diagram illustrating idealized feedback voltage characteristics.

The voltage wave forms in FIG. 2 characterize the feedback voltage at the terminal E1 at zero input voltage, plus full scale input voltage and minus full scale input voltage, respectively. The interval $t1$ in each instance represents the fixed period of time provided by the circuits controlled by the crystal oscillator XO while the interval of time $t2$ represents the period of time provided by the circuits controlled by the voltage controlled oscillator VCO.

For the purposes of description with respect to the operation of the feedback circuit, assume that the cycle has proceeded to the point where the frequency divider FD1 has accumulated sufficient counts that its output flip-flop has switched to the higher of its two voltage states providing an enabling voltage on the terminal K2 of the flip-flop switch drive. Since the crystal oscillator XO is coupled to the input terminal K1 of the flip-flop the next succeeding positive going output of the crystal oscillator XO couples a positive going voltage to that input terminal which switches the flip-flop switch drive FSD. At this time the electrical output of the terminal S5, if it is not already high, is switched to the higher of its two potentials, say from some negative potential to ground potential, and, at the same time, the terminal S6 drops from ground potential to some negative potential. The rise in potential on terminal S5, by reason of its coupling to terminal J4 and to the gated amplifier type of AND circuit AG, now enables the J side of the flip-flop switch drive FSD and the gated AND gate amplifier AG. The next positive going excursion of the output of the crystal oscillator XO is now gated to the input of the frequency divider FD2 which now begins its count cycle. The frequency divider FD2 at this time is in that electrical configuration in which the most significant flip-flop is in its "1" representing electrical state in which it remains from its last cycle and the other flip-flops therein are in their "0" representing electrical state, as will be seen from the explanations which follow. With this counter configuration, midway in the count cycle all of the flip-flops of the frequency divider FD2 are in their "1" representing electrical states and on the next cycle of the crystal oscillator the flip-flops all switch to their "0" representing electrical states. Assuming the same voltage ranges for the outputs of the frequency dividers, i.e., ground and a negative voltage, the output of the frequency divider FD2 at this time will switch from ground potential to some suitable negative voltage. The counting cycle for the frequency divider FD2 continues until the most significant flip-flip switches to its "1" representing electrical state which is the point at which the output of the frequency divider FD2 swings in a positive direction to ground potential. Since the terminal J4 is still enabled by the ground potential on the terminal S5 the positive going excursion of the output of the frequency divider FD2 switches the flip-flop switch drive so that the terminal S6 switches to ground and the terminal S5 switches to a negative potential. The gated amplifier AG is now cut off and the frequency divider remains in this electrical state. Thus, the voltage states of the output terminal S5 and S6 have been reversed during a particular fixed period of time determined by the crystal oscillator frequency and the frequency divider FD2. This period is the same during each cycle of the operation. The voltages at the terminals S7 and S8 switch between their upper (positive) and lower (negative) voltage levels synchronously with the voltages at the terminals S5 and S6. Thus, during the interval that the terminal S5 was in the higher of its two voltage states the terminal S7 was also in the higher of its two voltage states which enabled the transistor switch SW1 coupling positive reference potential (+Ref) to the terminal E1. This represents the beginning of the time interval t1, as seen in each case in FIGS. 2a, 2b and 2c. Whenever the flip-flop switch drive FSD changes electrical state so that the terminal S6 swings to the higher of its two voltage states, correspondingly switching the terminal S8 to the higher of its two voltage states, transistor switch SW1 is cut off and transistor switch SW2 is enabled coupling negative potential (−Ref) to the terminal E1 denoting the end of the time interval t1, as shown in each of FIGS. 2a, 2b and 2c. The circuit remains in this condition until such time as the frequency divider FD1 completes its count cycle to switch its output to the higher of its two voltage states, at which time the terminal K2 is enabled, whereupon the next positive going excursion of the crystal oscillator output coupled to the flip-flop terminal K1 switches the flip-flop so that the terminal S5 goes to the higher of its two voltage states swttching the voltage E1 to its higher voltage state (+Ref) as indicated. FIG. 2a depicts the condition at terminal E1 for zero input volts in the amplifier A1. FIG. 2b depicts the voltage condition at terminal E1 for maximum positive input voltage at the amplifier A1 and FIG. 2c depicts the voltage at terminal E1 for maximum negative input voltage at the amplifier A1.

It is to be understood that the foregoing description assumes predetermined circuit parameters which permit depicting the wave form 2a for zero input volts as having equal time durations in its positive and negative voltage states. Other conditions may exist wherein this idealized wave form may not exist, that is, the time intervals are not necessarily the same.

FIG. 3 depicts only a portion of the arrangement illustrated in FIG. 1. Those portions of the circuit which are not shown will be understood to be the same as those in FIG. 1. In this arrangement a modification of the reference voltage circuit has been made wherein the transistor switch SW2 has its collector grounded and the collector of the transistor switch SW1 is coupled to any suitable stable positive source of reference voltage as shown. The terminal E1 is again coupled through the filter F and the resistor R1 to the terminal TE3 of amplifier A1 which again, as in the case of FIG. 1, is of the potentiometric type. A suitable supply of stable negative reference voltage is coupled by means of an adjustable resistor R2 to the terminal TE3 of the potentiometric amplifier. It is to be understood that the positive and negative reference voltage sources indicated may be interchanged from that indicated. The function of the circuit will be understood by reference to FIG. 1.

The converter of this invention will also function correctly with an operational amplifier as shown in FIG. 4. The operational amplifier illustrated therein is designated A10 and is an integrating type of operational amplifier typically shunted by an integrating capacitor C. In this arrangement calibrating resistor R3 is coupled in the input circuit to the amplifier and resistor R1 in the feedback loop is also commonly coupled with the resistor R3 into this input circuit. An amplifier of this type has certain advantages over the potentiometric type of amplifier in that its use as an integrating device can be utilized to help with filtering. Although the operational amplifier version has a lower input impedance than the potentiometric type of amplifier, it is ordinarily easier to build such an amplifier than it is to build the potentiometric type of amplifier.

The arrangement illustrated in FIG. 5 also employs an operational amplifier and utilizes a reference voltage circuit of the general type illustrated in FIG. 3 wherein the collecter of the transistor switch SW2 is coupled to ground and the collector of the transistor switch SW1 is coupled to a positive reference voltage source. In this arrangement the input resistor R3, the feedback resistor R1 and the reference voltage coupling resistor R2 are all commonly coupled to the input circuit of the operational amplifier A1. The operational amplifier in both FIGS. 4 and 5 are conventional and further description as to their details is believed unnecessary.

It should be noted in connection with the reference voltage supplies of FIGS. 3 and 5 that both plus and minus voltage references are needed only for a bipolar type of input. If other than a bipolar input is used the use of only a single reference supply against which one of the transistor switches must work is feasible. In this case the other reference supply would provide a very light and constant load and could probably be the supply voltage of a zener diode.

The arrangements illustrated hereinabove can all be converted to voltage to time converters by providing a voltage controlled oscillator which converts voltage to time. This requires a change in the feedback network. This change will include making the first crystal count down a longer period than the variable time period provided from the voltage controlled oscillator, that is, the time T1 will now be a longer time period than the longest expected time T2. With this arrangement the crystal oscillator then sets a known frequency of signal and the voltage controlled oscillator sets the duty cycle. By way of example, the arrangement might provide a voltage to time conversion of 100 M sec. and 300 M sec. for voltage inputs ranging from plus full scale, to zero, to minus full scale, respectively. The crystal oscillator frequency might be such that a 400 M total period is obtained at the switches resulting in duty cycles of .25, .5 and .75 for the 3 named conditions. The various arrangements for obtaining the reference inputs disclosed in the voltage to frequency conversion circuits are equally applicable in the voltage to time conversion arrangement.

What is claimed is:

1. A converter circuit for receiving an input voltage and producing an output electrical quantity which is different from but which is representative of said input voltage, comprising:
    a voltage controlled oscillator having an input circuit and having an output circuit;
    an amplifier having an output circuit coupled to said input circuit of said voltage controlled oscillator and having a pair of input circuits;
    means coupled to one of said input circuits of said amplifier for coupling said input voltage thereto;
    a reference voltage circuit;
    switching circuit means coupling said reference voltage circuit to the other of said pair of input circuits of said amplifier;
    a fixed frequency timing circuit;
    a variable timing circuit coupled to and controlled by said voltage controlled oscillator;
    and circuit means coupling said fixed frequency and variable timing circuits to said switching circuit to control said switching circuit.

2. Apparatus as set forth in claim 1 in which a chopper circuit comprises one of said pair of input circuits of said amplifier and in which said switching circuit means is coupled to said chopper circuit.

3. Apparatus as set forth in claim 2 and including a chopper drive circuit coupled to said chopper circuit for driving said chopper circuit.

4. A converter circuit, comprising:
    a voltage controlled oscillator having an input circuit and having an output circuit;
    an amplifier having input circuit means and having an output circuit coupled to said input circuit of said voltage controlled oscillator;
    means coupled to said input circuit means of said amplifier for coupling an input voltage thereto;
    reference voltage circuit means;
    a switching circuit means coupling said reference voltage circuit means to said input circuit means of said amplifier;
    a variable timing circuit coupled to and driven by said voltage controlled oscillator and producing timing signals at variable intervals of time;
    a fixed frequency timing circuit producing timing signals at fixed intervals of time;
    and circuit means coupling said variable and fixed frequency timing circuits to said switching circuit means to control said switching circuit means.

5. Apparatus as set forth in claim 4 wherein said fixed frequency timing circuit includes means for producing timing signals establishing smaller timing intervals than the signals produced by said variable timing circuit.

6. Apparatus as set forth in claim 4 wherein said fixed frequency timing circuit includes means for producing timing signals establishing greater timing intervals than the signals produced by said variable timing circuit.

7. A converter circuit for receiving an input voltage and producing an output electrical quantity which is different from but which is representative of said input voltage, comprising:
    a voltage controlled oscillator having an input circuit and having an output circuit;
    an amplifier having an output circuit coupled to said input circuit of said voltage controlled oscillator and having a pair of input circuits;
    means coupled to one of said input circuits of said amplifier for coupling said input voltage thereto;
    a reference voltage circuit;
    switching circuit means coupling said reference voltage circuit to the other of said pair of input circuits of said amplifier;

a first counter;
a fixed frequency oscillator;
a second counter;
circuit means coupling said first counter to said output circuit of said voltage controlled oscillator to be driven thereby;
bistable switching means having a pair of output circuits coupled to and controlling said switching circuit means and having input circuits coupled respectively to said first and second counters to be controlled thereby; and
gating means coupled to and controlled by said bistable switching means for coupling said fixed frequency oscillator to said second counter to drive said second counter.

References Cited
UNITED STATES PATENTS

| | | | |
|---|---|---|---|
| 2,994,825 | 8/1961 | Anderson | 324—120 X |
| 3,127,601 | 3/1964 | Kaenel | 340—347 |
| 3,201,781 | 8/1965 | Holland | 324—99 |

ARTHUR GAUSS, *Primary Examiner.*

J. HEYMAN, *Assistant Examiner.*